(12) United States Patent  
Suzuki

(10) Patent No.: US 8,941,268 B2  
(45) Date of Patent: Jan. 27, 2015

(54) NON-CONTACT POWER TRANSMISSION APPARATUS

(75) Inventor: Katsuya Suzuki, Gunma (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 505 days.

(21) Appl. No.: 13/349,966

(22) Filed: Jan. 13, 2012

(65) Prior Publication Data

US 2012/0223588 A1    Sep. 6, 2012

Related U.S. Application Data

(60) Provisional application No. 61/449,203, filed on Mar. 4, 2011.

(51) Int. Cl.
- *H01F 38/00* (2006.01)
- *H02J 5/00* (2006.01)
- *H02J 7/02* (2006.01)
- *H02J 17/00* (2006.01)
- *H02M 7/00* (2006.01)

(52) U.S. Cl.
CPC .................. *H02J 5/005* (2013.01); *H02J 7/025* (2013.01); *H02J 17/00* (2013.01); *H02M 7/003* (2013.01)

USPC .......................................................... 307/104

(58) Field of Classification Search
CPC ....................................................... H01F 38/00
USPC .......................................................... 307/104
See application file for complete search history.

(56) References Cited

U.S. PATENT DOCUMENTS

| 7,696,718 | B2 | 4/2010 | Suzuki | |
| 8,552,593 | B2* | 10/2013 | Jung et al. | ..................... 307/104 |
| 2011/0062791 | A1* | 3/2011 | Shearer et al. | ................ 307/104 |
| 2012/0009869 | A1 | 1/2012 | Suzuki et al. | |
| 2012/0056497 | A1 | 3/2012 | Suzuki et al. | |

FOREIGN PATENT DOCUMENTS

JP    2010-183812    8/2010

* cited by examiner

*Primary Examiner* — Hal Kaplan  
(74) *Attorney, Agent, or Firm* — Oblon, Spivak, McClelland, Maier & Neustadt, L.L.P.

(57) ABSTRACT

A non-contact power transmission apparatus that includes a power supply circuit that generates electrical power; a switch connected to an output of the power supply circuit; a first power transmission antenna connected to a first output of the switch; a second power transmission antenna connected to a second output of the switch; a communication interface that communicates with a device; and a control unit that controls the switch based on a state of the device obtained via the communication interface.

20 Claims, 11 Drawing Sheets

NON-CONTACT POWER TRANSMISSION APPARATUS

CROSS REFERENCE TO RELATED APPLICATION

The present application claims the benefit of the earlier filing date of U.S. Provisional Patent Application Ser. No. 61/449,203 filed on Mar. 4, 2011, the entire contents of which is incorporated herein by reference.

BACKGROUND OF THE DISCLOSURE

1. Field of the Disclosure

The present disclosure relates to a non-contact power transmission apparatus that supplies electrical power to a secondary battery in an electronic apparatus.

2. Description of Related Art

In recent years, a power source has been provided that can charge a secondary battery in a terminal device in a non-contact state in which a terminal of another device, such as a charging device, that supplies power, or the like is not connected to the terminal device.

As a non-contact power transmission method that has hitherto been performed, an electromagnetic induction method is known. This is such that a power transmission coil is arranged in an apparatus on the side in which electrical power is transmitted, and a power receiving coil is arranged on the power-receiving-side terminal device. In this electromagnetic induction method, the power transmission coil of the power-transmission-side apparatus is brought into proximity of the power receiving coil of a power-receiving-side apparatus, both the coils are flux-coupled, and electrical power is supplied in a non-contact manner.

This electromagnetic induction method is a non-contact power transmission technology that has hitherto been known. The transmissible distance is approximately several mm, and electrical power can be transmitted only among devices that are very near. For this reason, currently, the electromagnetic induction method is used in some devices, such as waterproof terminal devices in which it is difficult to expose a charging terminal.

In comparison, in recent years, as a method for efficiently supplying electrical power in a non-contact manner to a terminal device at a long distance to a certain degree, a method called a magnetic-field resonance method has begun to be developed and put into the market. This is such that an LC circuit formed of a coil, a capacitor, and the like is provided in each of a power-transmission-side apparatus and a power-receiving-side apparatus, and magnetic fields are made to resonate between both the circuits, thereby transmitting electrical power in a wireless manner. In order to cause the magnetic fields to resonate between both the circuits, it is necessary to make the frequencies at which the resonance is performed equal to each other.

In the case of the magnetic-field resonance method, transmission at a short distance of approximately several cm to several m becomes possible. Furthermore, if there are a plurality of power-receiving-side apparatuses within the transmissible range, electrical power transmission can be performed simultaneously from one power-transmission-side apparatus to the plurality of power-receiving-side apparatuses.

A technology is described in Japanese Unexamined Patent Application Publication No. 2010-183812 in which, in order to improve the efficiency of non-contact power transmission, a plurality of primary side coils are arranged in one row in a horizontal direction on the power transmission side, and coils which are combined in which the electrical power transmission efficiency is high are selected when electrical power is to be transmitted to a secondary side coil.

As described above, in a case where a plurality of secondary side coils are arranged in one row in a horizontal direction, it is possible to deal with a position displacement of the power-receiving-side apparatus with respect to the direction in which the secondary side coils are arranged. However, in a case where the position is displaced in a direction different from the direction in which the secondary side coils are arranged, it is not possible to increase transmission efficiency even if any of the coils is used. Furthermore, if a large number of secondary side coils are to be arranged, the configuration of the power-transmission-side apparatus becomes complex as the number of coils arranged increases.

In addition, in the case of the magnetic-field resonance method, electrical power can be transmitted from a primary side coil to a plurality of power-receiving-side apparatuses. However, if a large primary side coil is arranged, which can efficiently transmit electrical power to a plurality of power-receiving-side apparatuses at the same time, efficiency is not good much when electrical power is transmitted to only one power-receiving-side apparatus by the one large primary side coil.

SUMMARY

The inventors of the present application have recognized necessity of performing efficient electrical power transmission with a simple configuration in a case where non-contact power transmission is to be performed from a charging device to a terminal device.

According to a first exemplary embodiment, the disclosure is directed to a non-contact power transmission apparatus that includes a power supply circuit that generates electrical power; a switch connected to an output of the power supply circuit; a first power transmission antenna connected to a first output of the switch; a second power transmission antenna connected to a second output of the switch; a communication interface that communicates with a device; and a control unit that controls the switch based on a state of the device obtained via the communication interface.

According to another exemplary embodiment, the disclosure is directed to a method performed by a non-contact power transmission apparatus. The method includes generating, by a power supply circuit, electrical power to be provided to one of a first power transmission antenna and a second power transmission antenna, which are each connected to an output of the power supply circuit via a switch; communicating, via a communication interface, with a device; and controlling, by a control unit, the switch based on a state of the device obtained from the device via the communicating.

According to another exemplary embodiment, the disclosure is directed to a computer-readable medium including computer program instructions, which when executed by a non-contact power transmission apparatus, cause the non-contact power transmission apparatus to perform a method comprising: controlling a switch, which is connected between a power supply circuit that generates power and first and second power transmission antennas, based on a state of a device received via a communication interface of the non-contact power transmission apparatus.

DETAILED DESCRIPTION

Hereinafter, embodiments of the present disclosure will be described in the following order.
1. First Embodiment
1.1 Example of shapes of charging device and terminal device (FIG. 1)
1.2 Example of configuration of charging device (FIG. 2)
1.3 Antenna arrangement of charging device (FIG. 3 to FIG. 5)
1.4 Example of configuration of terminal device (FIG. 6)
1.5 Transmission efficiency at the time of power transmission (FIG. 7)
1.6 Flow of power transmission process (FIG. 8)
1.7 Example of arrangement of terminal device (FIG. 9 to FIG. 11)
2. Second Embodiment (FIG. 12, FIG. 13)
3. Third Embodiment (FIG. 14, FIG. 15)
4. Fourth Embodiment (FIG. 16, FIG. 17)
5. Modifications 1. First Embodiment A first embodiment of the present disclosure will be described with reference to FIGS. 1 to 11. The present embodiment is a system that is constituted by a charging device that is a non-contact power transmission apparatus and a terminal device in which an incorporated battery is charged by electrical power that is transmitted from the charging device. Electrical power transmission from the charging device to the terminal device is performed in a non-contact manner by using a magnetic-field resonance method. Furthermore, in the present embodiment, the terminal device is used as a mobile phone terminal device.

1.1 Example of Shapes of Charging Device and Terminal Device

Figure 1:
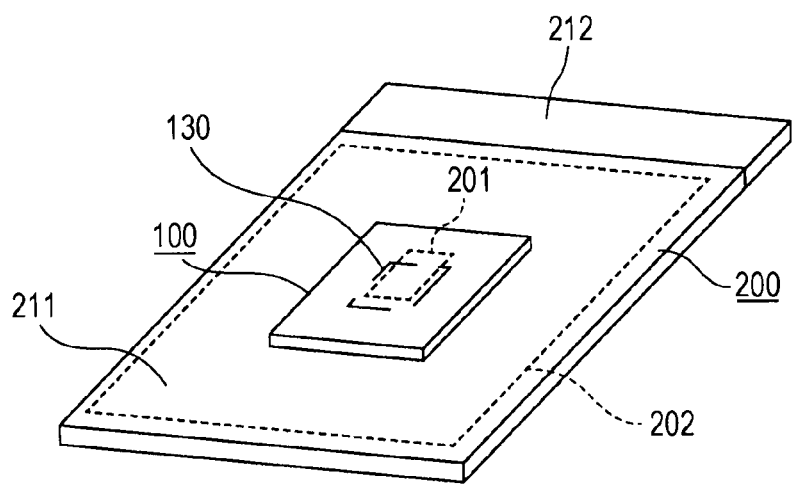
FIG. 1 is a perspective view illustrating a non-contact power transmission apparatus according to a first embodiment of the present disclosure.

FIG. 1 illustrates an example of the shapes of a charging device and a terminal device of the first embodiment.

A charging device 200 is made up of a housing having a planar part 211 on the top surface thereof. As shown in FIG. 1, as a result of mounting a terminal device 100 on the planar part 211 of the charging device 200, electrical power that is transmitted from a first power transmission antenna 201 or a second power transmission antenna 202 arranged inside the planar part 211 is supplied to the terminal device 100, causing the battery inside the terminal device 100 to be charged. The example of FIG. 1 shows that only one terminal device 100 is mounted on the planar part 211. However, as will be described later, it is possible that a plurality of terminal devices are mounted on the planar part 211, and these are charged at the same time.

1.2 Example of Configuration of Charging Device

Figure 2:
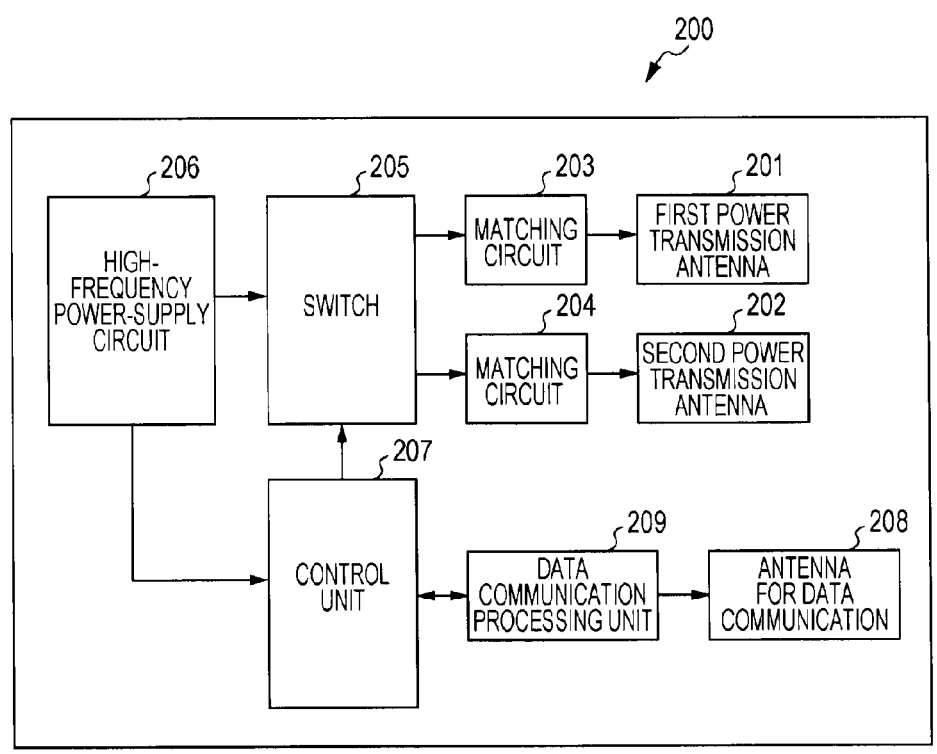
FIG. 2 is a block diagram illustrating the configuration of a charging device according to the first embodiment of the present disclosure.

Referring to FIG. 2, the configuration of a charging device of the present embodiment will be described.

The charging device 200 includes a high-frequency power-supply circuit 206 serving as a power-supply unit. A DC power supply in which a commercial AC power supply is rectified, or a DC power supply from a car battery, is supplied to the high-frequency power-supply circuit 206. Inside the high-frequency power-supply circuit 206, a high-frequency power supply at a frequency corresponding to the resonance frequency for non-contact electrical power transmission is generated from the supplied DC power supply. Then, information on the electrical power of the high-frequency power supply that is generated by the high-frequency power-supply circuit 206, or the like, is supplied to a control unit 207.

Furthermore, the high-frequency power-supply circuit 206 supplies the generated high-frequency power supply to only one of the first power transmission antenna 201 and the second power transmission antenna 202 through a switch 205. The examples of the arrangement of the first power transmission antenna 201 and the second power transmission antenna 202 will be described later. The respective antennas 201 and 202 are each formed as a coil antenna in which a conductor is arranged in the form of a coil.

A matching circuit 203 is provided between the switch 205 and the first power transmission antenna 201, and a matching circuit 204 is provided between the switch 205 and the second power transmission antenna 202. Each of the matching circuits 203 and 204 is a circuit for performing adjustment of a frequency in a case where non-contact electrical power transmission is to be performed, and the like.

The selection of the antenna by the switching in the switch 205 is controlled by the control unit 207. The control unit 207 performs a process for selecting an antenna in accordance with a predetermined processing procedure. The details of the processing procedure for selecting an antenna in the control unit 207 will be described later.

Furthermore, the charging device 200 includes a data communication processing unit 209 for performing wireless communication with adjacent terminal devices, and a data communication antenna 208 is connected to the data communication processing unit 209.

The data communication processing unit 209 is a communication processing circuit acting as a short-distance wireless communication unit for performing wireless communication with terminal devices in proximity to the charging device 200. For this data communication processing unit 209, for example, a short-distance wireless method (near-field wireless method) called NFC (Near Field Communication) that is applied to wireless tags is used, and a data communication process with the other party in proximity (to a degree of approximately several cm) is performed. Alternatively, for the data communication processing unit 209, a wireless LAN (Local Area Network) method, a Bluetooth (trademark) method, an infrared transmission method, or the like may be applied.

It is sufficient that the data communication processing unit 209 has a capability of performing wireless communication with a terminal device that is close to such a degree as to be in contact with the charging device 200, and it is not necessary for the data communication processing unit 209 to perform wireless communication with a terminal device that is separated to such a degree as to not be able to perform non-contact power transmission.

Data communication by the data communication processing unit 209 is performed under the control of the control unit 207. Since data communication is performed by the data communication processing unit 209, the control unit 207 detects that a terminal device capable of receiving electrical power exists in the vicinity of the charging device 200. Furthermore, when power transmission is to be started under the control of the control unit 207, the control unit 207 causes the data communication processing unit 209 to perform data communication so as to perform an authentication process for a power-receiving-side terminal device, and also obtains information on the power receiving state from the terminal device.

1.3 Antenna Arrangement of Charging Device

Figure 3:
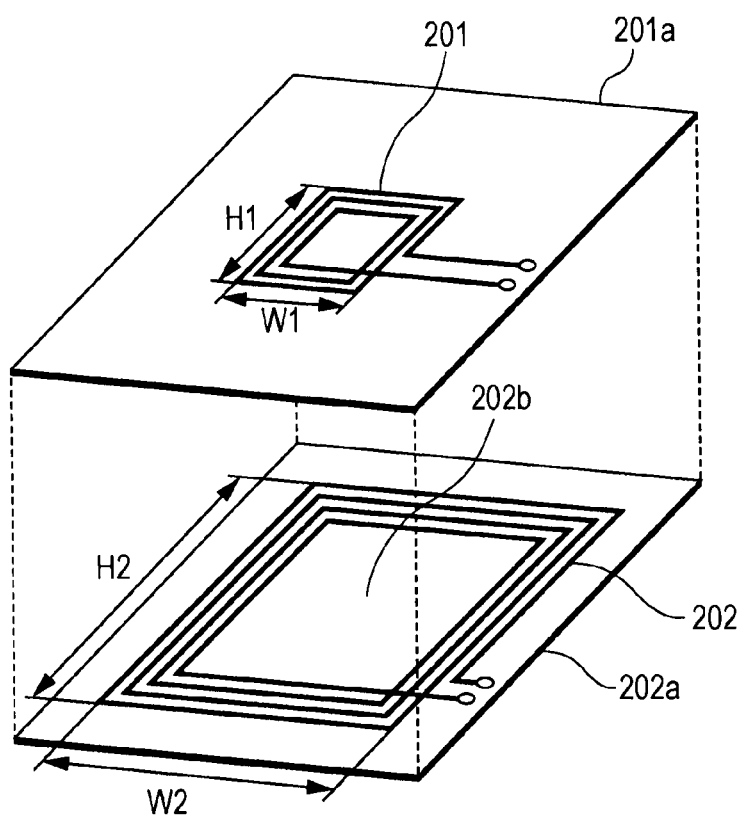
FIG. 3 is an exploded perspective view illustrating an antenna arranged state according to the first embodiment of the present disclosure.
Figure 4:
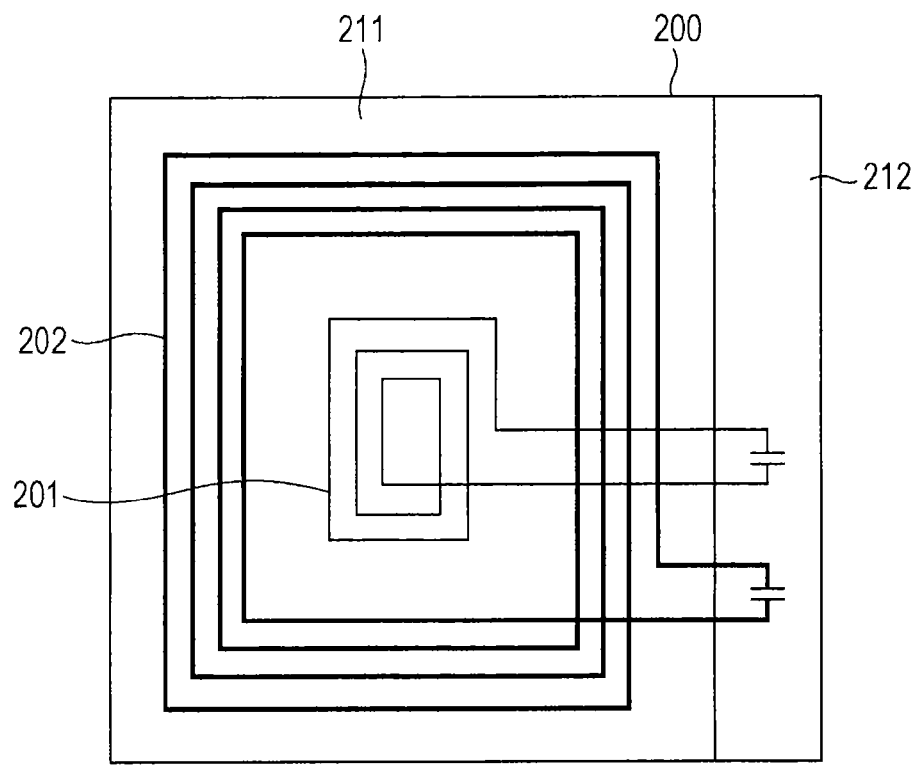
FIG. 4 is a plan view illustrating an antenna arranged state according to the first embodiment of the present disclosure.
Figure 5:
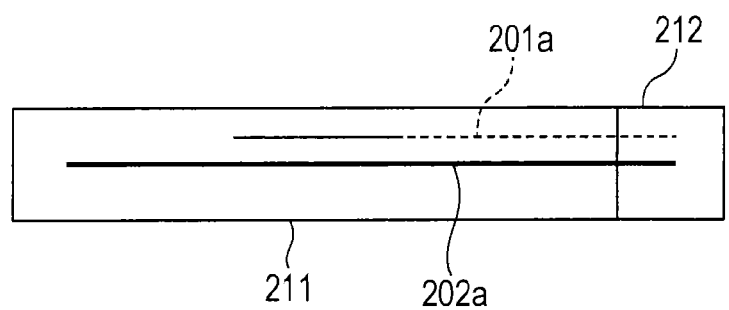
FIG. 5 is a side view illustrating an antenna arranged state according to the first embodiment of the present disclosure.

FIGS. 3 to 5 illustrate a state in which the first power transmission antenna 201 and the second power transmission antenna 202 provided in the charging device 200 are arranged.

As shown in FIG. 3, the first power transmission antenna 201 and the second power transmission antenna 202 are formed as a conductor pattern formed in other printed boards 201a and 202a, and the printed boards 201a and 202a are arranged in such a manner as to overlap each other inside the charging device 200.

The power transmission antennas 201 and 202 are formed in such a manner that a conductor is wound a plurality of times in the form of a rectangle on the printed boards 201a and 202a, respectively. The pattern of the conductor forming the first power transmission antenna 201 is arranged in a comparatively small area in almost the center on the printed board 201a. That is, as shown in FIG. 3, the horizontal width W1 and the vertical width H1 at the place where the pattern of the conductor as the first power transmission antenna 201 is wound are set to comparatively small sizes. The horizontal width W1 and the vertical width H1 of this power transmission antenna 201 are sizes that are approximately equal to the horizontal width and the vertical width of a power receiving antenna provided in the power-receiving-side apparatus.

In contrast, a horizontal width W2 and a vertical width H2 at the place where the pattern of the conductor as the second power transmission antenna 202 is wound are set to be larger than the horizontal width W1 and the vertical width H1 of the first power transmission antenna 201. For example, the horizontal width W2 and the vertical width H2 are set to a size that is almost equal to the size in a case where two terminal devices 100 are arranged side by side, or to a size larger than that. Furthermore, the conductor forming the second power transmission antenna 202 is arranged on the printed board 202a in a state in which a center unit 202b is formed. The center unit 202b in which this conductor is not arranged has a size larger than at least the horizontal width W1 and the vertical width H1 of the first power transmission antenna 201.

In FIG. 3, the two printed boards 201a and 202a are set to the same size. However, for example, the printed board 201a on which the first power transmission antenna 201 is formed may be formed at a size smaller than the printed board 202a. Furthermore, in the example of FIG. 3, the first power transmission antenna 201 is arranged above the second power transmission antenna 202. Conversely, the second power transmission antenna 202 may be arranged above the first power transmission antenna 201. In addition, as a configuration in which a multilayered conductor is arranged on one printed board, both the first power transmission antenna 201 and the second power transmission antenna 202 may be arranged on one printed board.

FIG. 4 is an illustration of the arrangement of the first power transmission antenna 201 and the second power transmission antenna 202 when viewed from the top surface of the charging device 200. FIG. 4 illustrates an antenna arrangement inside the device, and in practice, the power transmission antennas 201 and 202 cannot be seen from the surface of the charging device 200.

As shown in FIG. 4, the first power transmission antenna 201 is arranged in the inner portion of the center of the planar part 211 of the charging device 200, and the second power transmission antenna 202 is arranged in the surroundings of the first power transmission antenna 201. The conductors forming the power transmission antennas 201 and 202 are connected to a circuit substrate (not shown) arranged in the circuit arrangement unit 212 adjacent to the planar part 211.

FIG. 5 is an illustration of the arrangement of the power transmission antennas 201 and 202, shown in FIG. 4, when viewed from the side surface of the charging device 200.

As shown in FIG. 5, the printed board 201a on which the first power transmission antenna 201 is formed, and the printed board 202a on which the second power transmission antenna 202 is formed, are arranged in such a manner as to overlap one another inside the charging device 200.

1.4 Example of Configuration of Terminal Device

Figure 6:
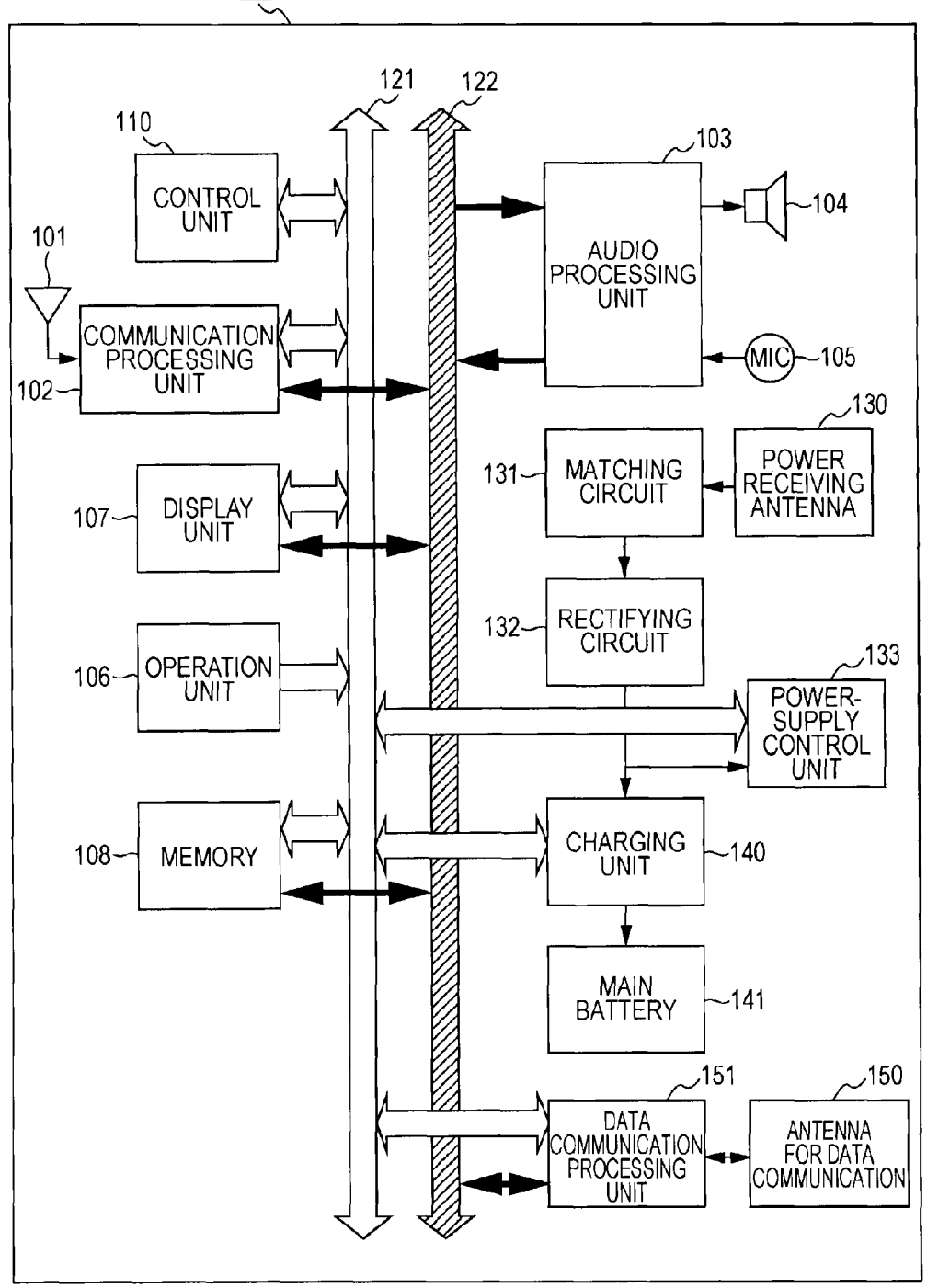
FIG. 6 is a block diagram illustrating the configuration of a power-receiving-side terminal device according to the first embodiment of the present disclosure.

FIG. 6 illustrates the internal configuration of a terminal device of the present embodiment. The terminal device 100 of the present embodiment is a mobile phone terminal device that performs wireless telephone communication, which is formed at a small size so as to be carried.

Referring to FIG. 6, the configuration of the terminal device 100 (see FIG. 1) will be described. A communication processing unit 102 to which an antenna 101 for wireless telephone communication is connected is a processing unit that performs wireless communication with a base station for wireless telephones under the control of the control unit 110.

At the time of a voice call, voice data contained in the data received by the communication processing unit 102 is supplied to an audio processing unit 103. Then, a process for decoding the voice data is performed in the audio processing unit 103, and an analog voice signal is obtained. The voice signal obtained by the audio processing unit 103 is supplied to a speaker 104, whereby an output is made.

Furthermore, the audio signal that is picked up and obtained by a microphone 105 is supplied to the audio processing unit 103, whereby the audio signal is coded to predetermined voice data by the audio processing unit 103. Then, the obtained voice data is supplied to the communication processing unit 102, whereby the voice data is wirelessly transmitted.

The processing units, such as the communication processing unit 102 and the audio processing unit 103, perform transmission and reception of control data with the control unit 110 through a control line 121, and also perform data transmission of voice data through a data line 122. Data transmission other than this is also performed among the units inside the terminal device 100 through the control line 121 and the data line 122.

Operation data from the operation unit 106 made up of keys, a touch panel, and the like, the operation unit 106 being operated by a user, is supplied to the control unit 120, and a process indicated by the operation data is performed by the control unit 110.

Furthermore, the terminal device 100 includes a display unit 107 made up of an image display panel, a driving circuit thereof, and the like. The display on this display unit 107 is controlled by the control unit 110. Examples of displays on the display unit 107 include, in addition to a display necessary for a wireless telephone terminal device at the time of call origination and call reception, a display of electronic mail text for performing reception and transmission, a display of images obtained as a result of the connection to the Internet, and furthermore, a display as a consequence of execution of various functions provided in the terminal device 100.

A memory 108 is connected to the control unit 110 through the control line 121 and the data line 122, with various data necessary for a communication terminal device 100 being stored in the memory 108. Furthermore, a program for performing an authentication process, which will be described later, or the like is also stored in the memory 108 when non-contact power transmission starts.

Furthermore, the terminal device 100 includes a data communication processing unit 151 that performs short-distance wireless communication, and a data communication antenna 150 is connected to the data communication processing unit 151. The data communication processing unit 151 is a processing unit that performs wireless communication with the other party nearby. For short-distance wireless communication, for example, a short distance (near field) wireless method called an NFC method, a wireless LAN (Local Area Network) method, a Bluetooth (trademark) method, an infra-red transmission method, or the like can be applied.

In the present embodiment, when the terminal device 100 performs power reception from the charging device 200, the short-distance wireless communication unit 151 of the terminal device 100 performs wireless communication with the charging device 200.

Furthermore, the terminal device 100 includes a processing unit for performing power reception in non-contact power transmission in a magnetic-field resonance method. That is, the terminal device 100, which includes a power receiving antenna 130 that is a coil antenna, rectifies the electrical power received by the power receiving antenna 130 by using a rectifying circuit 132 after the electrical power passes through a matching circuit 131, and thereafter supplies the electrical power to a charging unit 140. The power receiving antenna 130 is arranged inside the rear surface of the configuration forming the terminal device 100. The power receiving antenna 130 is formed so as to be nearly the same size as the first power transmission antenna 201 of the charging device 200. By using the electrical power obtained from the rectifying circuit 132, the charging unit 140 performs a process for charging a main battery 141 that is a secondary battery.

The power reception using the power receiving antenna 130 and the charging of the main battery 141 are performed under the control of a power-supply control unit 133.

When the control of the power reception is to be performed by the power-supply control unit 133, the power-supply control unit 133 judges the amount of received electrical power and the like, and transmits information, such as the judged amount of received electrical power, to the charging device 200 side through wireless communication using the data communication processing unit 151.

1.5 Transmission Efficiency at the Time of Power Transmission

As a result of mounting the terminal device 100 on the planar part 211 of the charging device 200 as shown in FIG. 1, the electrical power transmitted from the first power transmission antenna 201 of the charging device 200 or from the second power transmission antenna 202 thereof is received by the power receiving antenna 130 of the terminal device 100, and non-contact power transmission is performed. When the state in which the power transmission antenna and the power receiving antenna are arranged is changed at the time of this non-contact power transmission, the transmission efficiency is also greatly changed.

Figure 7:
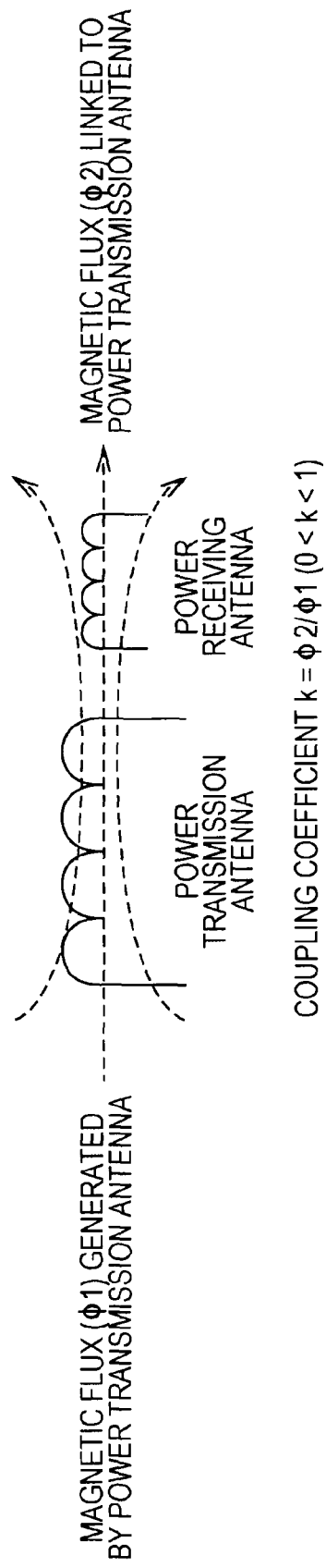
FIG. 7 is an illustration illustrating transmission efficiency according to the first embodiment of the present disclosure.

FIG. 7 illustrates inter-antenna efficiency at the time of non-contact power transmission. The transmission efficiency at the time of non-contact power transmission is determined on the basis of primary side circuit efficiency (circuit efficiency on the power transmission side), the inter-antenna efficiency, and secondary side circuit efficiency (circuit efficiency on the power reception side).

The inter-antenna efficiency is determined on the basis of the product of the coupling coefficient k of the antenna and the Q value of the resonance coil forming the antenna.

The coupling coefficient k is a ratio of a magnetic flux $\phi 1$ that is generated by the coil forming the power transmission antenna to a magnetic flux $\phi 2$ that links the coil forming the power receiving antenna, and is represented by the following expression.

$$\text{coupling coefficient } k = \phi 2/\phi 1$$

where k is a value greater than 0 and less than 1.

As can be seen from the expression of the above-mentioned coupling coefficient, the state in which the coupling coefficient is high is a case in which the shape of the power transmission antenna is the same as that of the power receiving antenna, and both the antennas have been aligned. The coupling coefficient is changed on the basis of the positional relationship between the power transmission antenna and the power receiving antenna. On the other hand, in a case where power transmission is to be performed from one charging device to a plurality of terminal devices at the same time, it is preferable that the power transmission antenna has a size at which a plurality of terminal devices can be mounted. However, even if the power transmission antenna is made large, since the coupling coefficient is resultingly decreased, the efficiency of non-contact power transmission is decreased to less than in the case where power transmission is performed to only one terminal device.

1.6 Flow of Power Transmission Process

Figure 8:
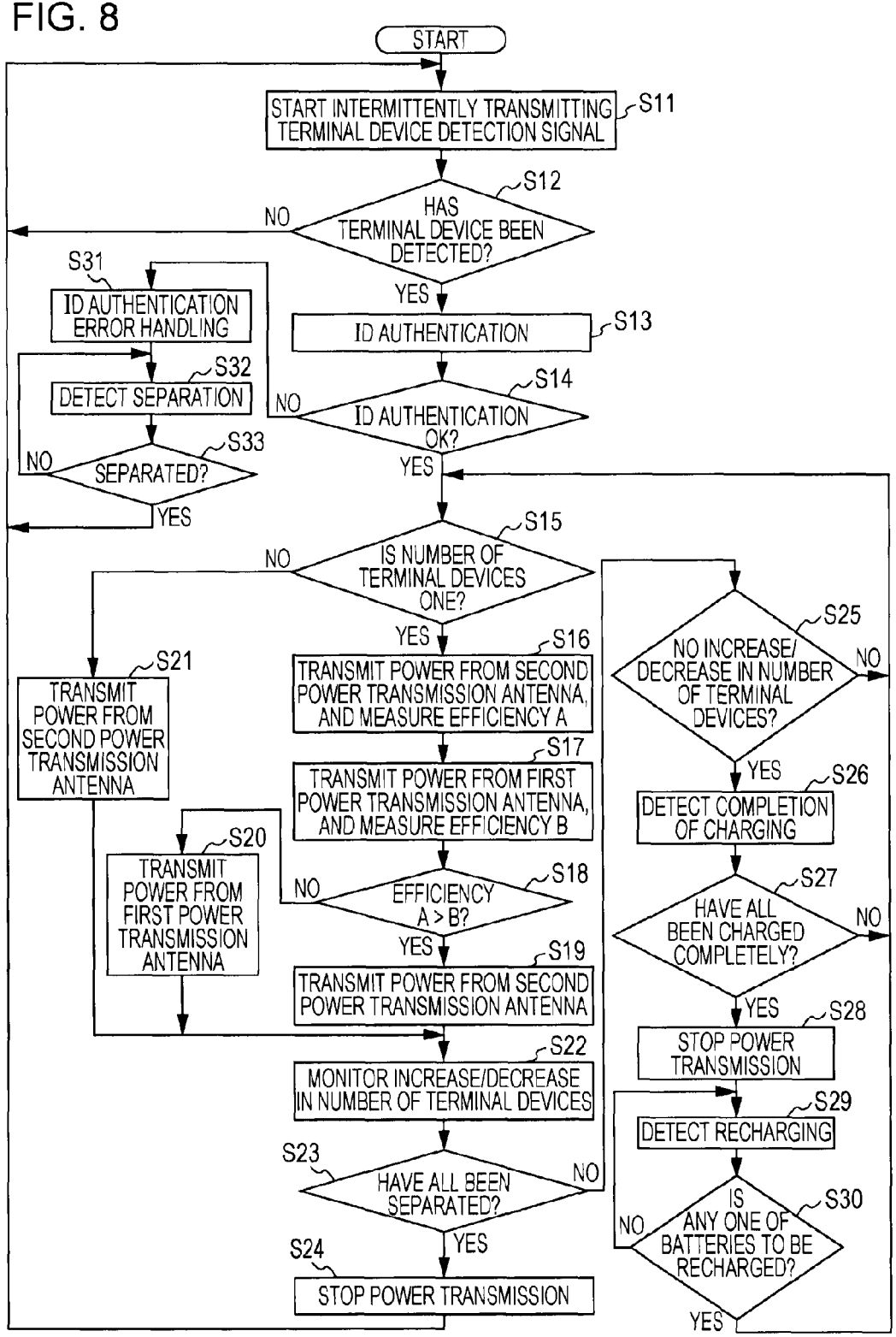
FIG. 8 is a flowchart illustrating the flow of a power transmission process according to the first embodiment of the present disclosure.

Next, a description will be given, with reference to the flowchart of FIG. 8, of an example of a processing procedure in which non-contact power transmission is performed from the charging device 200 to the terminal device 100 so as to charge the main battery 141 inside the terminal device 100. The process of this flowchart of FIG. 8 is performed under the control of the control unit 207 of the charging device 200.

First, the control unit 207 of the charging device 200 intermittently transmits a terminal device detection signal from a data communication antenna 150 by using a data communication processing unit 209 (step S11). Then, the control unit 207 judges whether or not a response signal for the intermittently transmitted terminal device detection signal is detected (step S12), and waits until a response signal is detected.

When it is determined in step S12 that a response signal is detected, a process for authenticating a terminal identification number (ID) for non-contact charging is performed with the terminal device 100 from which the response signal has been transmitted (step S13). This authentication process is also performed through wireless communication using the data communication processing unit 209. During this authentication process, the remaining charging level of the main battery 141 on the terminal device 100 side may be obtained by the charging device 200, and it may be determined whether or not charging to the terminal device 100 is necessary.

After that, on the basis of the result of the authentication process in step S13, the control unit 207 determines whether the authentication process has been completed (that is, non-contact charging is possible) or the authentication process has failed (that is, non-contact charging is not possible) (step S14).

When it is determined in step S14 that the authentication process has been completed and the terminal device 100 capable of being charged without contact has come nearby, the control unit 207 determines whether or not the number of terminal devices 100 in which the authentication process has been performed is one (step S15). When it is determined in step S15 that the number of terminal devices 100 is not one (that is, plural), the second power transmission antenna 202 is selected as a power transmission antenna by the switch 205, and electrical power transmission is started (step S21).

When it is determined in step S15 that the number of terminal devices 100 is one, the control unit 207 causes the switch 205 to select the second power transmission antenna 202 as a power transmission antenna, and performs electrical power transmission for a short time period. While the electrical power transmission is being performed, the received electrical power is measured by a power-supply control unit 133 of the terminal device 100, and the data of the measured received electrical power value is transmitted to the charging device 200 in the data transmission process using the data communication processing unit 151. In the charging device 200, a process for receiving the data of the received electrical power value transmitted by the data communication processing unit 209 is performed, and the transmission efficiency is detected on the basis of the ratio of the transmitted electrical power value to the actually received electrical power value (step S16). The transmission efficiency that is detected in this step S16 will be referred to as transmission efficiency A.

After that, the control unit 207 causes the switch 205 to select the first antenna 201 as a power transmission antenna, and performs electrical power transmission for a short time period. Then, while the electrical power transmission is being performed, the received electrical power is measured by the power-supply control unit 133 of the terminal device 100, and the data of the measured received electrical power value is transmitted to the charging device 200 in the data transmission process using the data communication processing unit 151. In the charging device 200, a process for receiving the data of the received electrical power value transmitted by the data communication processing unit 209 is performed, and the transmission efficiency is detected on the basis of the ratio of the transmission electrical power value to the actually received electrical power value (step S17). The transmission efficiency that is detected in this step S17 will be referred to as transmission efficiency B.

When the transmission efficiencies A and B are obtained, in the control unit 207, the transmission efficiency A is compared with the transmission efficiency B (step S18). When the transmission efficiency A is determined to be higher at the comparison in step S18, the control unit 207 causes the switch 205 to select the second power transmission antenna 202, and starts electrical power transmission for battery charging (step S19). The case in which the transmission efficiency A is higher than the transmission efficiency B corresponds to a state in which the position of the first power transmission antenna 201 does not match the position of the power receiving antenna 130.

When it is determined in the comparison of step S18 that the transmission efficiency B is higher, the control unit 207 selects the first power transmission antenna 201 by using the switch 205, and starts electrical power transmission for battery charging (step S20). The case in which the transmission efficiency B is higher than the transmission efficiency A corresponds to a state in which the position of the first power transmission antenna 201 almost matches the position of the power receiving antenna 130.

When the electrical power transmission in steps S19, S20, and S21 starts, the control unit 207 of the charging device 200 monitors the increase/decrease in the number of terminal devices 100 (step S22). The monitoring of this increase/decrease is performed, for example, in such a way that the intermittent transmission of a terminal device detection signal is performed in the same manner as at the time of the process in step S11 so as to monitor the presence or absence of a response from a new terminal device and also to monitor whether or not the response from the terminal device 100 in which the electrical power transmission is being performed is continued.

Then, on the basis of the monitoring result in step S22, it is determined whether or not all the terminal devices 100 have separated from the charging device 200 (step S23). When it is determined in step S23 that all the terminal devices 100 have separated from the charging device 200, the control unit 207 stops the power transmission from the charging device 200 (step S24). Then, after the power transmission is stopped, the control unit 207 returns to the determination process in step S11.

Also, when it is determined in step S23 that the terminal device 100 exists in the vicinity of the charging device 200, the control unit 207 determines whether or not the number of terminal devices 100 has increased/decreased (step S25). When it is determined in step S25 that there is an increase/decrease in the number of terminal devices, the process returns to the determination process of step S15.

When it is determined in step S25 that there is no increase/decrease, the control unit 207 checks whether the charging to the main battery 141 inside the terminal device 100 is to be continued (step S26), and determines whether or not the charging for all the terminal device 100s has been completed (step S27). When it is determined in step S27 that the charging for all the terminal devices 100 has not been completed (that is, there is a terminal device in which charging is being continued), the process returns to the determination process of this.

When it is determined in step S27 that the charging for all the terminal devices 100 has been completed, the control unit 207 stops the power transmission (step S28), and detects the remaining level of the main battery 141 inside the terminal device 100 (step S29). After the detection in step S29 is performed, it is determined whether or not the detected remaining level of the battery has decreased to the remaining level of the battery at which recharging is started (step S30). When it is determined in step S30 that there is no terminal device 100 whose remaining level of the battery has reached the remaining level of the battery at which the recharging is started, the process returns to the determination of step S29.

When it is determined in step S30 that even one terminal device 100 that has reached the remaining level of the battery at which recharging is started is detected, the process returns to the determination process of step S15.

Furthermore, when it is determined in step S14 that an authentication process with a nearby terminal device has failed, error handling in which power transmission to the corresponding terminal device is not performed is performed (step S31). In addition, a process for detecting whether or not the terminal device in which the error handling has been performed continues to exist nearby is performed (step S32). Then, on the basis of the detection process in step S32, it is determined whether or not the corresponding terminal device has separated from the charging device 200 (step S33). When the terminal device has not separated from the charging device 200, the existence detection of step S32 is continued. When it is determined in step S33 that the corresponding terminal device has separated from the charging device 200, the process returns to the process of step S11.

With such a processing procedure, non-contact transmission is performed from the charging device 200 to the terminal device 100, and the main battery 141 inside the terminal device 100 is charged. Consequently, it is possible to satisfactorily perform non-contact power transmission from the charging device 200 to the terminal device 100. That is, for example, as shown in FIG. 1, in a case where the terminal device 100 is mounted in nearly the center of the planar part 211 of the charging device 200, the power receiving antenna 130 on the terminal device 100 side almost matches the position of the first power transmission antenna 201, and comparatively high transmission efficiency is obtained. In the case of the arranged state shown in FIG. 1, at the time of determination in step S18 of the flowchart of FIG. 8, it is determined that the efficiency B is higher, and the first power transmission antenna 201 is used for power transmission.

1.7 Example of Arrangement of Terminal Device

Next, examples of states in which terminal devices are arranged, which differ from the state in which the terminal device of FIG. 1 is arranged, will be described with reference to FIGS. 9 to 11.

Figure 9:
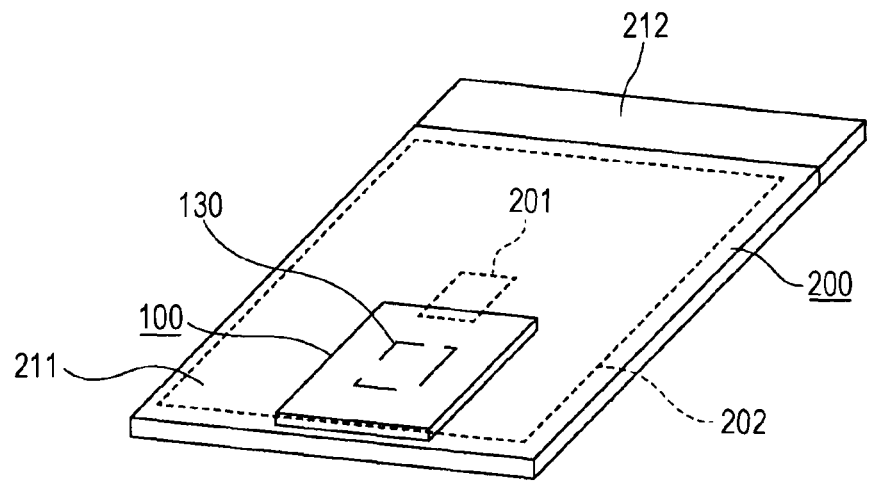
FIG. 9 is an illustration illustrating an example in which a terminal device is arranged according to the first embodiment of the present disclosure.

An example of the arrangement shown in FIG. 9 is a case in which one terminal device 100 is arranged offset greatly from the center at which the first power transmission antenna 201 is arranged.

In the case of this example of FIG. 9, the power receiving antenna 130 of the terminal device 100 comes into proximity to the conductor forming the second power transmission antenna 202, and the case in which the second power transmission antenna 202 is used causes the transmission efficiency to become higher. Therefore, in the case of this example of FIG. 9, it is determined in step S18 of the flowchart of FIG. 8 that the efficiency A is higher, and the second power transmission antenna 202 is used for power transmission.

In the case of this example of FIG. 9, the transmission efficiency becomes poorer than in the example of FIG. 1. However, since the large power transmission antenna 202 is used to perform a power transmission process, non-contact power transmission is more satisfactory than in a case in which the small power transmission antenna 201 is used and electrical power transmission is performed.

Figure 10:
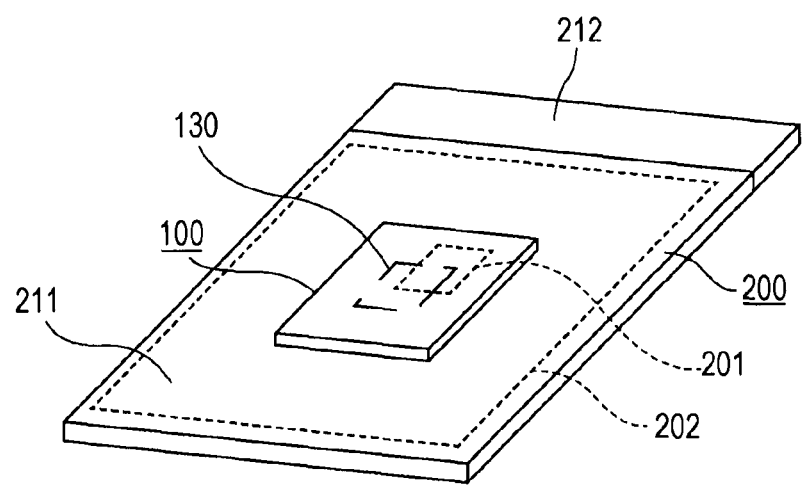
FIG. 10 is an illustration illustrating an example in which a terminal device is arranged according to the first embodiment of the present disclosure.

The example of the arrangement shown in FIG. 10 is an example of a case in which one terminal device 100 is arranged at a position that is slightly offset from the center at which the first power transmission antenna 201 is arranged.

The case of this example of FIG. 10 is a state in which a portion of the first power transmission antenna 201 overlaps a portion of the power receiving antenna 130, and there is a high probability that the first power transmission antenna 201 is used for power transmission. However, in the case of the arranged state of this example of FIG. 10, the transmission efficiency becomes slightly poorer than in the example of FIG. 1.

Figure 11:
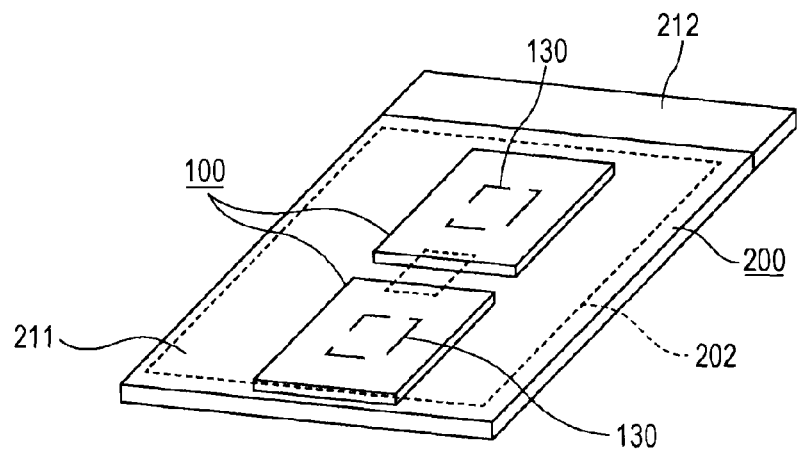
FIG. 11 is an illustration illustrating an example in which a terminal device is arranged according to the first embodiment of the present disclosure.

The example of the arrangement shown in FIG. 11 is a case in which two terminal devices 100 are prepared, and are arranged side by side on the planar part 211 of the charging device 200.

In this case, regardless of the positional relationship between the terminal devices 100, the second power transmission antenna 202 that is a large antenna is used to perform power transmission, and electrical power transmission can be performed comparatively satisfactorily to two terminal devices 100. As described above, in the case where two terminal devices 100 are mounted, "NO" is set in the determination process of step S15 in the flowchart of FIG. 8. Consequently, the second power transmission antenna 202 is always used as indicated in step S21. For this reason, a certain level of transmission efficiency is obtained.

2. Second Embodiment

Next, a second embodiment of the present disclosure will be described with reference to FIGS. 12 and 13.

The second embodiment is such that the shape of the charging device and the arrangement of the power transmission antenna have been changed compared to the first embodiment. For the block configuration inside the charging device, the configuration shown in FIG. 2 can be applied, and thus, the description thereof is omitted herein.

A charging device 300 shown in FIGS. 12 and 13 will be described. The charging device 300 is configured in such a manner that a housing having a first planar part 311 and a housing having a second planar part 312 are rotatably joined using a hinge unit 303. In the example of FIGS. 12 and 13, the first planar part 311 is arranged in such a manner as to be slightly inclined.

Then, a first power transmission antenna 301 is arranged in the inside of nearly the center of the first planar part 311, and a second power transmission antenna 302 is arranged in the second planar part 312. The first power transmission antenna 301 is an antenna of nearly the same size as the power receiving antenna 130 provided in the terminal device 100, and the second power transmission antenna 302 is an antenna in a shape larger than that of the terminal device 100. In the perspective view of FIG. 12, the antennas 301 and 302 are indicated using dashed lines, and in the side view of FIG. 13, the state in which the antennas 301 and 302 are arranged inside the housing is indicated using a solid line.

Figure 12:
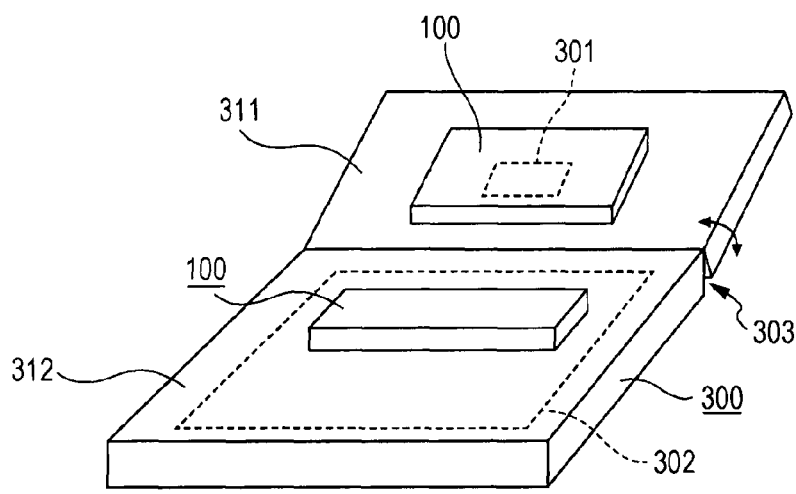
FIG. 12 is a perspective view illustrating a charging device according to a second embodiment of the present disclosure.

As shown in FIG. 12, one terminal device 100 can be mounted on the first planar part 311 side. Furthermore, one or more terminal devices 100 can be mounted on the second planar part 312 side.

Figure 13:
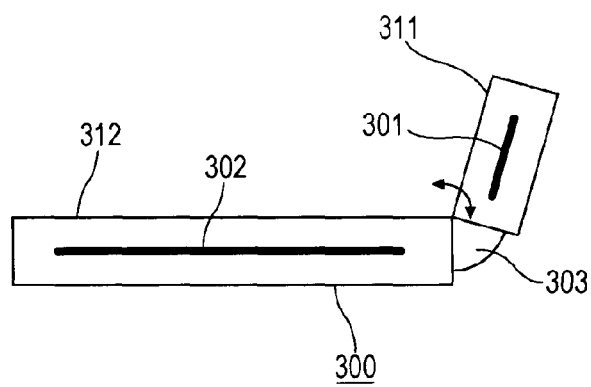
FIG. 13 is a side view illustrating the charging device according to the second embodiment of the present disclosure.

Also, in the case of the configurations shown in FIGS. 12 and 13, for example, by using a process for selecting a power transmission antenna, which is indicated in the flowchart of FIG. 8, selection of an appropriate power transmission antenna can be made, and advantageous effects that are the same as those in the case of the first embodiment are obtained.

3. Third Embodiment

Next, a third embodiment of the present disclosure will be described with reference to FIGS. 14 and 15.

The third embodiment is such that the shape of the charging device and the arrangement of the power transmission antenna are changed when compared to the first embodiment. The block configuration inside the charging device is the same as the configuration shown in FIG. 2, and thus, the description thereof is omitted herein.

A charging device 400 shown in FIGS. 14 and 15 will be described. The charging device 400 is configured in such a way that a first planar part 411 and a second planar part 412 are arranged with a step difference therebetween. In the examples of FIGS. 14 and 15, the first planar part 411 is arranged at a position slightly higher than that of the second planar part 412.

Then, a first power transmission antenna 401 is arranged in the inside of nearly the center of the first planar part 411, and a second power transmission antenna 402 is arranged in the second planar part 412. The first power transmission antenna 401 is an antenna of nearly the same size as the power receiving antenna 130 provided in the terminal device 100, and the second power transmission antenna 402 is an antenna in a shape larger than that of the terminal device 100. In the perspective view of FIG. 14, the antennas 401 and 402 are indicated using dashed lines, and in the side view of FIG. 15, the position of the arrangement of each of the antennas 401 and 402 inside the housing is indicated using a solid line.

Figure 14:
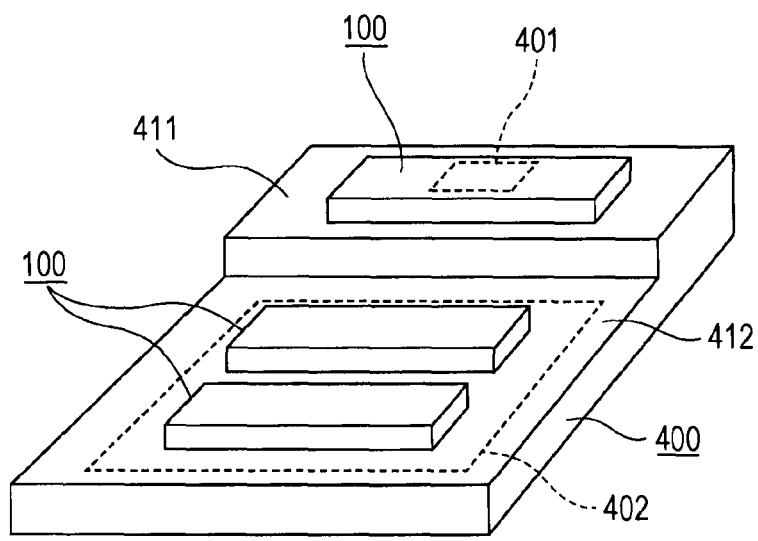
FIG. 14 is a perspective view illustrating a charging device according to a third embodiment of the present disclosure.

As shown in FIG. 14, one terminal device 100 can be mounted on the first planar part 411 side, and one or more terminal devices 100 can be mounted on the second planar part 312 side.

Figure 15:
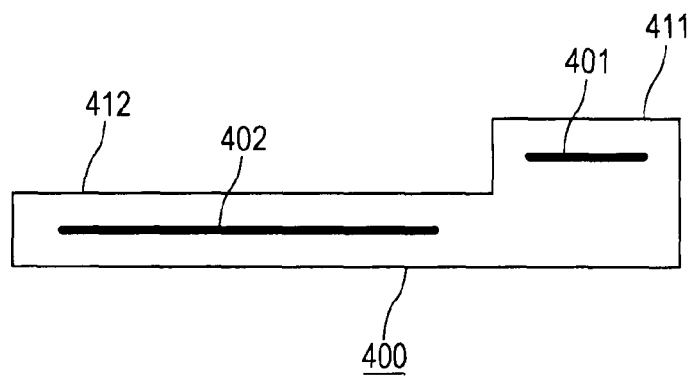
FIG. 15 is a side view illustrating the charging device according to the third embodiment of the present disclosure.

Also, in the configurations shown in FIGS. 14 and 15, for example, by using a process for selecting a power transmission antenna, which is shown in the flowchart of FIG. 8, it is possible to select an appropriate power transmission antenna, and advantageous effects that are same as those in the case of the first embodiment are obtained.

4. Fourth Embodiment

Next, a fourth embodiment of the present disclosure will be described with reference to FIGS. 16 and 17. The fourth embodiment is also such that the shape of the charging device and the arrangement of the power transmission antenna are changed when compared to the first embodiment. The block configuration inside the charging device is the same as the configuration shown in FIG. 2, and thus, the description thereof is omitted herein.

A charging device 500 shown in FIGS. 16 and 17 will be described. The charging device 500 is configured in such a way that a pocket part 511 and a planar part 512 are arranged side by side. The pocket part 511 is configured in such a way that, for example, an openable/closable lid is provided, and one terminal device 100 can be housed in the inside.

Then, the first power transmission antenna 501 is arranged in the inside of nearly the center of the pocket part 511, and the second power transmission antenna 502 is arranged in the planar part 512. The first power transmission antenna 501 is an antenna of nearly the same size as the power receiving antenna 130 provided in the terminal device 100, and the second power transmission antenna 502 is an antenna in a shape larger than that of the terminal device 100. In the perspective view of FIG. 16, the antennas 501 and 502 are indicated using dashed lines, and in the side view of FIG. 17, the positions of the antennas 501 and 502 inside the housing are indicated using solid lines.

Figure 16:
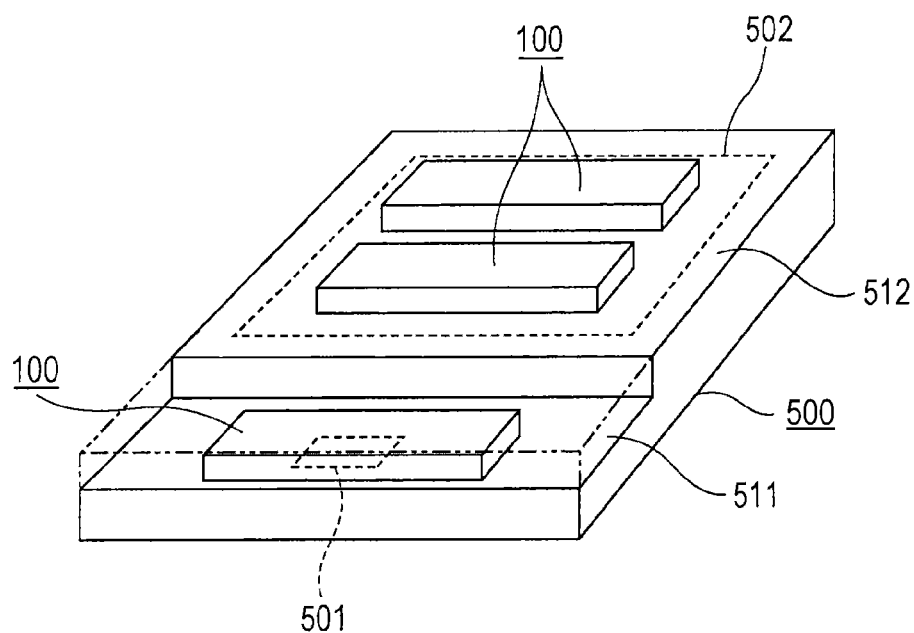
FIG. 16 is a perspective view illustrating a charging device according to a fourth embodiment of the present disclosure.

As shown in FIG. 16, one or more terminal devices 100 can be mounted on the planar part 512.

Figure 17:
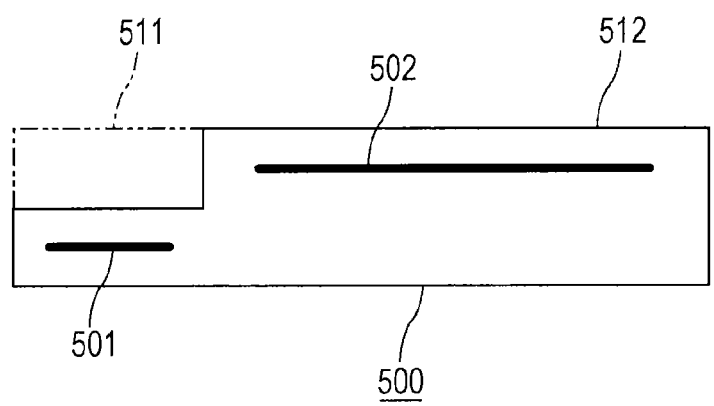
FIG. 17 is a side view illustrating the charging device according to the fourth embodiment of the present disclosure.

Also, in the case of the configurations shown in FIGS. 16 and 17, for example, a process for selecting a power transmission antenna, which is shown in FIG. 8, is applied. Consequently, it is possible to select an appropriate power transmission antenna, and advantageous effects that are the same as those of the first embodiment are obtained.

5. Modifications

In each of the above-mentioned embodiments, no particular description has been given regarding the setting in a charging device when power transmission is performed from the first power transmission antenna that is a comparatively small antenna and when power transmission is performed from the second power transmission antenna that is a comparatively large antenna. The electrical powers to be transmitted when power transmission is performed from both the power transmission antennas may be set to be the same. For example, in a case where the second power transmission antenna is used to transmit electrical power, the electrical power to be transmitted may be set to be larger than that when the first power transmission antenna is used to transmit electrical power.

Furthermore, at the time of the determination process in step S18 of the flowchart of FIG. 8, transmission efficiencies based on the two antennas are compared, and the higher of the transmission efficiencies is selected. Alternatively, the received electrical powers themselves may be compared, and the larger of the received electrical powers may be selected.

Furthermore, in the above-mentioned embodiments, as a power receiving device for receiving electrical power from the charging device, a mobile phone terminal device is used. Needless to say, other power receiving devices can be used when electrical power is supplied thereto in a non-contact manner. Examples of a usable apparatus for which electrical power supply is necessary for the purpose of charging include a music reproduction device, a video game device, a remote control device, and a personal computer device.

Furthermore, in the above-described embodiments, the power receiving device is used in non-contact power transmission employing a magnetic-field resonance method. However, the power receiving device can be used in non-contact power transmission based on another method as long as the method is a method of transmitting electrical power in a non-contact manner by using an antenna (coil).

Furthermore, the configurations and the processes described in the claims of the present disclosure are not limited to the above-described embodiments. It should be understood, of course, by those skilled in the art that various modifications, combinations, and other embodiments may be made according to the design or other elements insofar as they come within the scope of the claims, or the equivalence thereof.

The invention claimed is:

1. A non-contact power transmission apparatus, comprising:
a power supply circuit that generates electrical power;
a switch connected to an output of the power supply circuit;
a first power transmission antenna connected to a first output of the switch;
a second power transmission antenna connected to a second output of the switch;

a communication interface that communicates with a device; and a control unit that controls the switch based on a state of the device obtained via the communication interface.

2. The non-contact power transmission apparatus of claim 1, further comprising:
a first matching circuit connected between the first output of the switch and the first power transmission antenna; and
a second matching circuit connected between the second output of the switch and the second power transmission antenna.

3. The non-contact power transmission apparatus of claim 1, wherein
the second power transmission antenna is larger than the first power transmission antenna.

4. The non-contact power transmission apparatus of claim 3, further comprising:
a first printed board on which the first power transmission antenna is formed; and
a second printed board on which the second power transmission antenna is formed.

5. The non-contact power transmission apparatus of claim 4, wherein
the first printed board is disposed to overlap the second printed board.

6. The non-contact power transmission apparatus of claim 5, wherein
a first area defined by a periphery of the second power transmission antenna formed on the second printed board is greater than, and encompasses, a second area defined by a periphery of the first power transmission antenna formed on the first printed board.

7. The non-contact power transmission apparatus of claim 4, further comprising:
a hinge unit that rotatably joins the first printed board and the second printed board.

8. The non-contact power transmission apparatus of claim 4, wherein
the first and second printed boards are arranged such that a first plane defined by the first printed board and a second plane defined by the second printed board are parallel.

9. The non-contact power transmission apparatus of claim 8, wherein
the first and second printed boards do not overlap one another when viewed in a direction perpendicular to the first and second planes.

10. The non-contact power transmission apparatus of claim 8, further comprising:
a lid portion that detachably covers the first printed board.

11. The non-contact power transmission apparatus of claim 1, wherein
the control unit detects whether the device is located in proximity to the non-contact power transmission apparatus based on a signal received from the device via the communication interface.

12. The non-contact power transmission apparatus of claim 11, wherein
when the device is detected in proximity to the non-contact power transmission apparatus, the control unit controls the switch so that power is transmitted from the second power transmission antenna for a first predetermined period of time.

13. The non-contact power transmission apparatus of claim 12, wherein
the control unit determines a first transmission efficiency metric corresponding to the power transmitted from the second power transmission antenna to the device based on first data received from the device.

14. The non-contact power transmission apparatus of claim 13, wherein
when the first predetermined period of time lapses, the control unit controls the switch so that power is transmitted from the first power transmission antenna for a second predetermined period of time.

15. The non-contact power transmission apparatus of claim 14, wherein
the control unit determines a second transmission efficiency metric corresponding to the power transmitted from the first power transmission antenna to the device based on second data received from the device.

16. The non-contact power transmission apparatus of claim 15, wherein
when the second predetermined period of time lapses, the control unit compares the first and second power transmission efficiency metrics, and controls the switch based on a result of the comparison.

17. The non-contact power transmission apparatus of claim 1, wherein
the control unit detects whether a plurality of devices are located in proximity to the non-contact power transmission apparatus based on a signal received from the plurality of devices via the communication interface.

18. The non-contact power transmission apparatus of claim 17, wherein
the control unit controls the switch based a result of the detection.

19. A method performed by a non-contact power transmission apparatus, the method comprising:
generating, by a power supply circuit, electrical power to be provided to one of a first power transmission antenna and a second power transmission antenna, which are each connected to an output of the power supply circuit via a switch;
communicating, via a communication interface, with a device; and
controlling, by a control unit, the switch based on a state of the device obtained from the device via the communicating.

20. A computer-readable medium including computer program instructions, which when executed by a non-contact power transmission apparatus, cause the non-contact power transmission apparatus to perform a method comprising:
controlling a switch, which is connected between a power supply circuit that generates power and first and second power transmission antennas, based on a state of a device received via a communication interface of the non-contact power transmission apparatus.

* * * * *